United States Patent
Majumder et al.

(10) Patent No.: US 7,167,861 B2
(45) Date of Patent: Jan. 23, 2007

(54) MOBILE APPLICATION SERVICE CONTAINER

(75) Inventors: Deeptendu Majumder, Tewksbury, MA (US); Vikas Chawla, Burlington, MA (US); Vic Zaroukian, Winchester, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/184,001

(22) Filed: Jun. 28, 2002

(65) Prior Publication Data

US 2004/0002936 A1    Jan. 1, 2004

(51) Int. Cl.
    *G06F 17/30*    (2006.01)
(52) U.S. Cl. .................. 707/10; 707/101; 707/102; 707/103 X; 707/104.1
(58) Field of Classification Search ............ 707/103 X, 707/104, 10, 102, 101, 104.1; 709/223, 225, 709/226; 370/328, 338; 455/427, 560; 718/106
    See application file for complete search history.

(56) References Cited

U.S. PATENT DOCUMENTS

| | | | |
|---|---|---|---|
| 6,021,333 A * | 2/2000 | Anderson et al. | 455/560 |
| 6,151,309 A * | 11/2000 | Busuioc et al. | 370/328 |
| 6,167,253 A * | 12/2000 | Farris et al. | 455/412.2 |
| 6,445,682 B1 * | 9/2002 | Weitz | 370/257 |
| 6,654,363 B1 * | 11/2003 | Li et al. | 370/338 |
| 6,769,000 B1 * | 7/2004 | Akhtar et al. | 707/103 R |
| 6,848,103 B2 * | 1/2005 | Larsson et al. | 718/106 |
| 2001/0014913 A1 * | 8/2001 | Barnhouse et al. | 709/223 |
| 2001/0018349 A1 * | 8/2001 | Kinnunen et al. | 455/456 |
| 2002/0013149 A1 * | 1/2002 | Threadgill et al. | 455/427 |
| 2002/0057803 A1 * | 5/2002 | Loos et al. | 380/270 |
| 2002/0059411 A1 * | 5/2002 | Barnhouse et al. | 709/223 |
| 2002/0116698 A1 * | 8/2002 | Lurie et al. | 717/100 |
| 2002/0154646 A1 * | 10/2002 | Dubois et al. | 370/406 |
| 2002/0165988 A1 * | 11/2002 | Khan et al. | 709/246 |
| 2003/0009553 A1 * | 1/2003 | Benfield et al. | 709/224 |
| 2003/0014521 A1 * | 1/2003 | Elson et al. | 709/225 |
| 2003/0055735 A1 * | 3/2003 | Cameron et al. | 705/26 |
| 2003/0120593 A1 * | 6/2003 | Bansal et al. | 705/39 |
| 2003/0120764 A1 * | 6/2003 | Laye et al. | 709/223 |

OTHER PUBLICATIONS

Rysavy, Peter. "PCCA Standards for Wireless Networks." ACM SIGMOBILE Mobile Computing and Communications Review. vol. 3, No. 2, pp. 17-19. Apr. 1999. ACM Press.*
Peter Rysavy, "PCCA Standards for Wireless Networks", Mobile Computing and Communications Review, vol. 3, No. 2, pp. 17-19.

* cited by examiner

*Primary Examiner*—Thuy N. Pardo
(74) *Attorney, Agent, or Firm*—Banner & Witcoff, LTD

(57) ABSTRACT

A mobile application service container is described. Unlike conventional services provided by operators and third party resellers, services built upon application service container framework provide enhanced interoperability while minimizing duplicative consumption of resources.

22 Claims, 10 Drawing Sheets

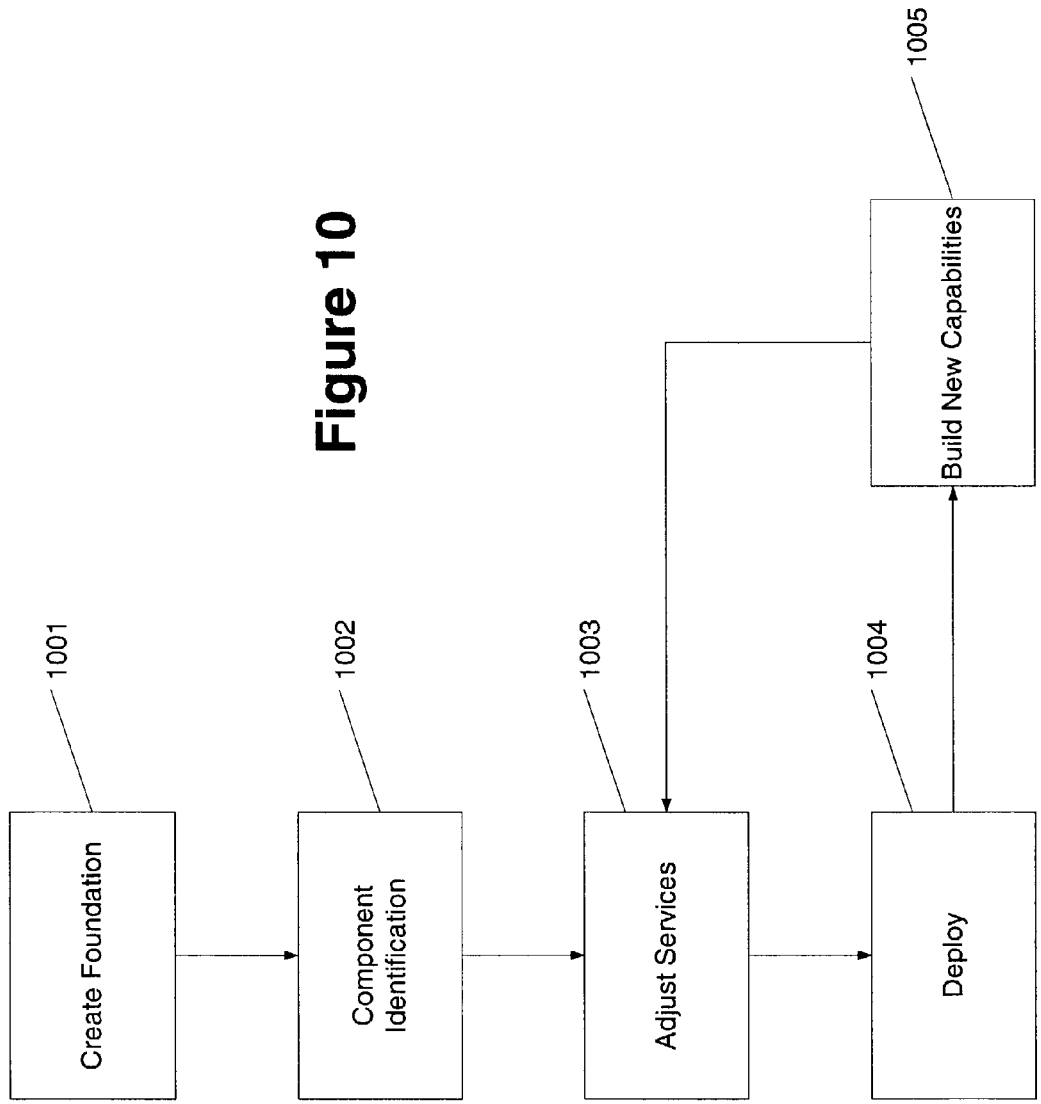

MOBILE APPLICATION SERVICE CONTAINER

FIELD OF THE INVENTION

This invention relates generally to mobile communications systems. More particularly the invention relates to a platform for building mobile application services.

BACKGROUND OF THE INVENTION

With the proliferation of cellular communications systems, consumers expect to receive a rich variety of services. Mobile operators have to provide their wireless customers with a wide range of the services. These generally take the form of consumer applications. In many cases, the deployed services are serviced by the mobile operators as well as third party (value added) providers. The services provided by mobile operators are generally referred to as enabler services. The third party or value added services are built on the foundation of the enabler services and often provide richer applications to the user.

As the cellular telecommunications industry provides larger bandwidths to users, there will likely be an increasing need for new communications services. These communications services will be provided by both mobile network operators as well as the third party, value added resellers. These applications may include multimedia services, presence and location services, messaging services, and the like. With the possibility of such a variety of services needing to be developed and deployed, the mobile operators and developers needs to be cognizant of system footprint, integration, interoperability, functional overlap, and shared resource management between these individual services.

Currently, there are various mobile solution service initiatives being pursued for the development of individual network services including, for example, MMSC, WAPG, SMSC, profile databases, and the like. While some commonality exists between applications, each application tends to have its own strategy and implementation for access and management functionalities when using these resources. Accordingly, each service's details make it difficult to deploy and manage complete solutions for a network operator in an easy and efficient manner. Often various hardware and software components need to be individually deployed and managed. This individualized deployment management forces undesired consumption of total allowable footprints, tight expenditures and other cost issues while providing mobile services. Finally, service providers are forced to develop service applications for each unique network. Because of the uniqueness of each network system, service providers are forced to re-implement applications to comport within the constraints of each network.

SUMMARY OF THE INVENTION

Aspects of the present invention are directed to providing a common framework for mobile services. This framework may take the form of an architectural model and a Java based implementation, resulting in a mobile service container. The container architecture defines a reusable framework for building and deploying cost effective mobile services for network operators in an efficient manner. With such a framework, new services and new applications may be developed and deployed in less time than conventional services. Another advantage is the potential for a plug-n-play type interoperability supporting divergent implementation of services.

BRIEF DESCRIPTION OF THE DRAWINGS

FIG. 10 shows a process of migrating a vendor to a mobile application service container in accordance with embodiments of the present invention.

DETAILED DESCRIPTION OF THE INVENTION

Aspects of the disclosed invention address one or more problems associated with development and deployment of conventional mobile services. For the purpose of simplicity, the present invention is described in terms of a Java-based implementation strategy. It is appreciated that other non-Java based solutions may be realized. Other non-Java solutions may be based on C++ and/or CORBA technologies.

The following description relates to a mobile application service framework in which an architecture is disclosed for realizing a greater efficiency for mobile distributed services. Next, a process for converting legacy services to the new framework is disclosed.

The mobile service is described as a container that may be replicated and distributed across a network. The container provides a standardized set of resource drivers and APIs. Mobile network operators and third party service providers may create services based on this standardized framework. The standardized framework, when adopted among multiple mobile networks, permits network operators and third party service providers to quickly create new services or transport existing services among networks having the container framework. A further advantage of the container framework is the ability to distributed services across a given network, thereby minimizing duplicative APIs and drivers among various services.

In one example, a container is created using J2EE (Java 2 Enterprise Edition) available from Sun Microsystems. The disclosed container implementation extends the execution environment of the J2EE (Java 2 Enterprise Edition) container to provide a framework which makes it easy to develop and deploy both enabler and value added mobile services. This container provides a framework and an evolution process for developing new mobile applications or services on top of already existing standard or de-facto standard mobile services in an interoperable manner. New services, as they mature and become the de-facto standard, may then be made part of the mobile services container through a process of service evolution, so that any future service or application can use these newly developed services.

A variety of abbreviations are used in describing the present invention. The following lists a number of those abbreviations.

| | |
|---|---|
| 3GPP | 3rd Generation Partnership Project |
| API | Application Programming Interface |
| CORBA | Common Object Request Broker Architecture |
| HTTP | Hyper Text Transfer Protocol |
| J2EE | Java 2 Enterprise Edition |
| MASC | Mobile Application Service Container |
| MMSC | Multi-media Messaging Service Center |
| OMA | Open Mobile Architecture |
| RMI | Remote Method Invocation |
| SMSC | Short Messaging Service Center |
| WAPG | Wireless Application Protocol Gateway |
| OSA | Open Service Access - a collection of service APIs for the telecommunications industry. |

Figure 1:
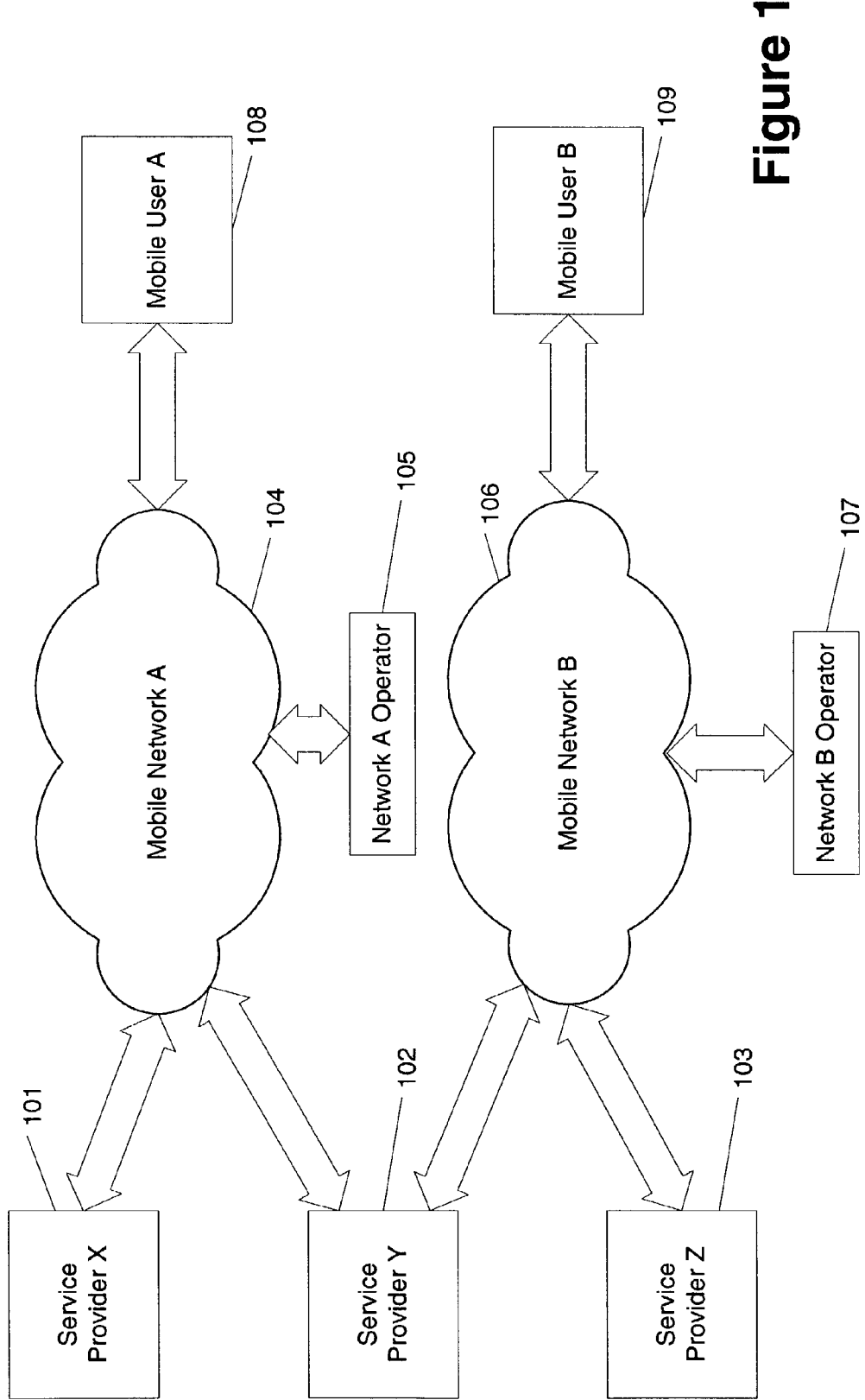
FIG. 1 shows a diagram of service providers providing services to one or more networks in accordance with aspects of the present invention.

FIG. 1 shows a variety of service provider's X-Z 101–103 providing services to mobile networks 104 and 106. Network A 104 is run by network A operator 105 and provides network communication pathways and services for mobile user A 108. Network B 106 is run by network B operator 107. Network B 106 provides communication pathways for mobile user B 109. Service provider X 101 develops services for network A 104. Similarly, service provider Z 103 develops services for network B 106. Service provider Y 102 develops services for both network A 104 and network B 106. If networks A 104 and B 106 have different requirements, a single service from service provider Y 102 may need to be significantly tailored for each of networks A 104 and B 106. Using the platform of the present invention, however, service provider Y 102 may provide his services based on a common framework used by networks A 104 and B 106 with minimal rework. While the networks A 104 and B 106 may be different in structure and different in range of services provided, the application container framework provides a greater level of interoperability for a single service provided by service provider Y 102.

Figure 2:
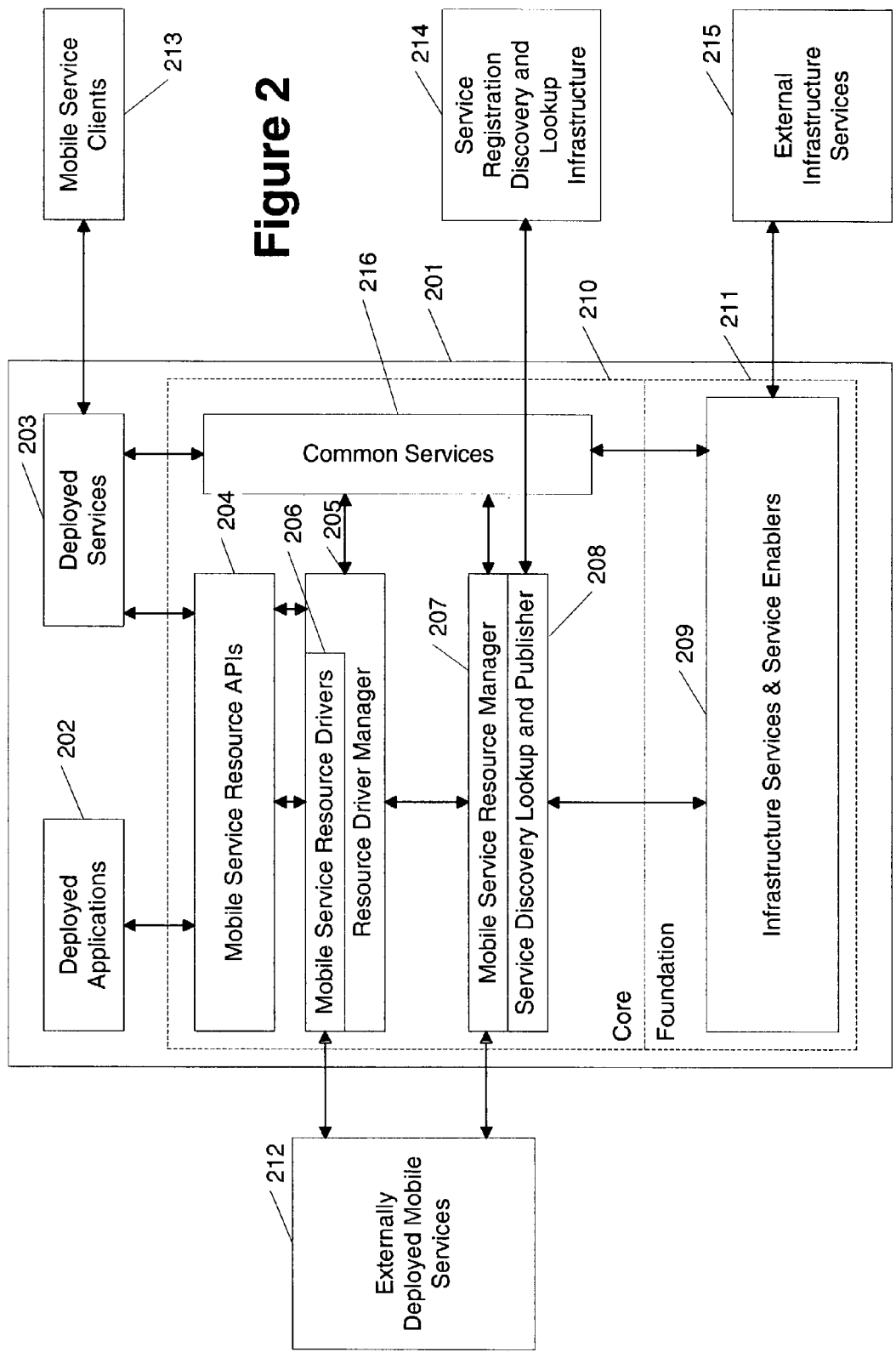
FIG. 2 shows a logical architecture for a mobile application service container in accordance with aspects of the present invention.

FIG. 2 discloses a logical architecture for a mobile application service container 201. Functional blocks are used to describing various components of the service container. It is appreciated that the functional blocks may be realized through software, hardware, and/or firmware.

Mobile application service container 201 includes at least two layers. The first layer is a foundation layer 211 and the second layer is core layer 210. The foundation layer 211 includes infrastructure services and infrastructure service enablers 209. These infrastructure services are the building blocks upon which the core services 210 of the mobile application service container 201 are built. The infrastructure services and service enablers 209 is connected to external infrastructure services 215. Through these layers, the mobile application service container incorporates various functionalities including resource discovery, resource lookup and resource utilization management.

The infrastructure services and enablers 209 includes the service execution environment and lower level services for building large-scale, enterprise class services. Some of these services include accepting client requests and execution thread management for processing of requests. Capabilities such as support for transaction management, security handling, and database access are also part of this sub-system or module.

The core layer 210 of the mobile application service container connects to 'container deployed' applications 202 and 'container deployed' services 203. Mobile service clients 213 are connected to the deployed services 203. These deployed applications 202 and services 203 are built by users (developers) of the container and are generally built for delivering multi-channel value added services for the end users. However, some of the deployed services may be part of the container 201 itself. These deployed applications 202 and services 203 use well-defined and standardized connectivity pathways to provide solid applications for all network operators, regardless of the actual network used. Services are designed to be reusable by other services and applications. Therefore, once a deployed service 203 becomes a standard component of offerings for mobile service developers, it may be incorporated into the container 201 itself, and becomes inherently supported by appropriate APIs and resource drivers.

The core layer 210 includes mobile service resource application programming interfaces 204. These interfaces provide support for standard mobile services that have been provided across multiple service vendors. Examples of standard mobile services include presents service, location surface, MMSC services, and the like. The mobile service resource APIs 204 are used by deployed applications 202 and deployed services 203. The mobile service resource API module encapsulates various APIs for standard or de-facto standard mobile services. Each of these APIs targets a specific mobile service such as SMSC, WAPG, MMSC and the like. The API module 204, among other things, handles protocol conversions. The specific API used may come from multiple vendors, thereby meaning it needs to be defined at so as to support a number of different vendors. A variety of different APIs may be used in. For example, the API in 204 may be a standardized API, may be a superset API with multilevel compliance, or an API based on the lowest common denominator when multiple implementations exist. The API in 204 may become its own standard, at which point it may be incorporated into other API layers.

The core layer 210 also includes common services 216 that include a set of services that are common to the mobile services but not necessarily available in the foundation layer 211. The common services 216 are connected between the deployed services 203 and the infrastructure service and service enablers 209. The common services 216 relate to services that are not always part of the infrastructure services 209. These common services may include event management, configuration management, logging services, and the like. Further the common services may also include customized APIs and drivers that provide connectivity to external services such as third party logging entities, event managers and configuration managers. In some implementations common services 216 may be completely supported by the infrastructure services and service enablers module 209, thereby eliminating common services module 216. Common services 216 may include event management, logging, and configuration management. These services may be used by 204, 207, and 203.

Core layer 210 further includes a resource driver manager 205 and mobile service resource drivers 206. The resource driver manager 205 manages vendor specific drivers 206. These drivers provide support for various applications and services that are specific to a vendor, and which are generally provided outside the mobile application service container 201. The mobile service resource drivers 206 are connected to externally deployed mobile services 212. These externally deployed mobile services 212 may provide a vendor-specific provider interface to the mobile service resource drivers 206.

To the extent possible, the generic services used by the system are inherently resident in the default J2EE platform. The implementation of the driver manager 205 and resource manager 207 and other high level container based services may require services of include event management, configuration management, logging, and the like. As the default J2EE framework often does not provide the all of the necessary capabilities natively for the mobile services, additional functionalities may be added as on shown in FIG. 4, below.

The combination of the mobile service resource driver 206 and the resource driver manager 205 provide the reuse and interoperability capabilities against existing services. They implement the service connectivity for the above mentioned APIs 204. These drivers 205/206 enable the applications deployed in the container 201 to access different implementations of given services. Initially most of these drivers are likely to be implemented by a container vendor for its own implementation of services like MMSC, WAPG and the like. But eventually drivers would be written for different service implementation from different vendors, particularly when no standards have been defined for these services.

One aspect of these drivers 205/206 is that they provide bi-directional, synchronous, asynchronous connectivity between these external services and their clients executing within the container. These drivers are also capable of handling protocol conversions and multi-layered protocol stacks and FIG. 5 below shows a generic architecture of such a driver.

The driver management sub-system 205/206 is a framework for implementing specific service access drivers that conform to the specific API defined as a part of the API subsystem. This management sub-system is also responsible for locating, loading and unloading appropriate drivers for the users of the APIs and is further connected to common services 216.

The core layer 210 further includes a mobile service resource manager 207 and a service discovery lookup and publisher module 208. The mobile service resource manager 207 is responsible for managing things like external services and allowing sharing of resources between applications. The mobile service resource manager 207 is also connected to the externally deployed mobile services 212 as well as the common services 216. The service discovery lookup and publisher module is connected to service registration discovery and lookup infrastructure 214.

The mobile service resource manager 207 is responsible for locating and managing access to other container and non-container based mobile services on the network. The resource management subsystem 207 with service discovery lookup and publisher 208 are responsible for lookup, discovery, acquisition, and utilization of various external services. The term "external" means services that are deployed outside a specific container instance. Therefore such services may also include services deployed in another container. When an application or a service running in a specific container instance needs an external enabler service, it may use the resource manager 207 to locate such a resource. The resource manager 207 is responsible for locating service resources on the operator's network and ensuring that they are utilized effectively by various requesting applications and services running in the container. One of the primary ways for resource manager 207 to ensure that resources are used efficiently is by pooling resource connections for use by requesting applications and services in the container as is known in the art. Effective use means that the connections to these external resources are shared between these clients whenever appropriate. The lookup and discovery mechanisms based technology (such as JINI) in module 208 enables the resource manager 207 to deal with potential unreliability in the network where remote services may join or leave the network at different times due to various reasons, including network, hardware, and software failures in a JAVA-based implementation. JINI is a network technology from Sun that provides mechanisms that enable services to fit together to form one or more communities where services may spontaneously come and go and interact through well-defined interaction protocols.

Figure 3:
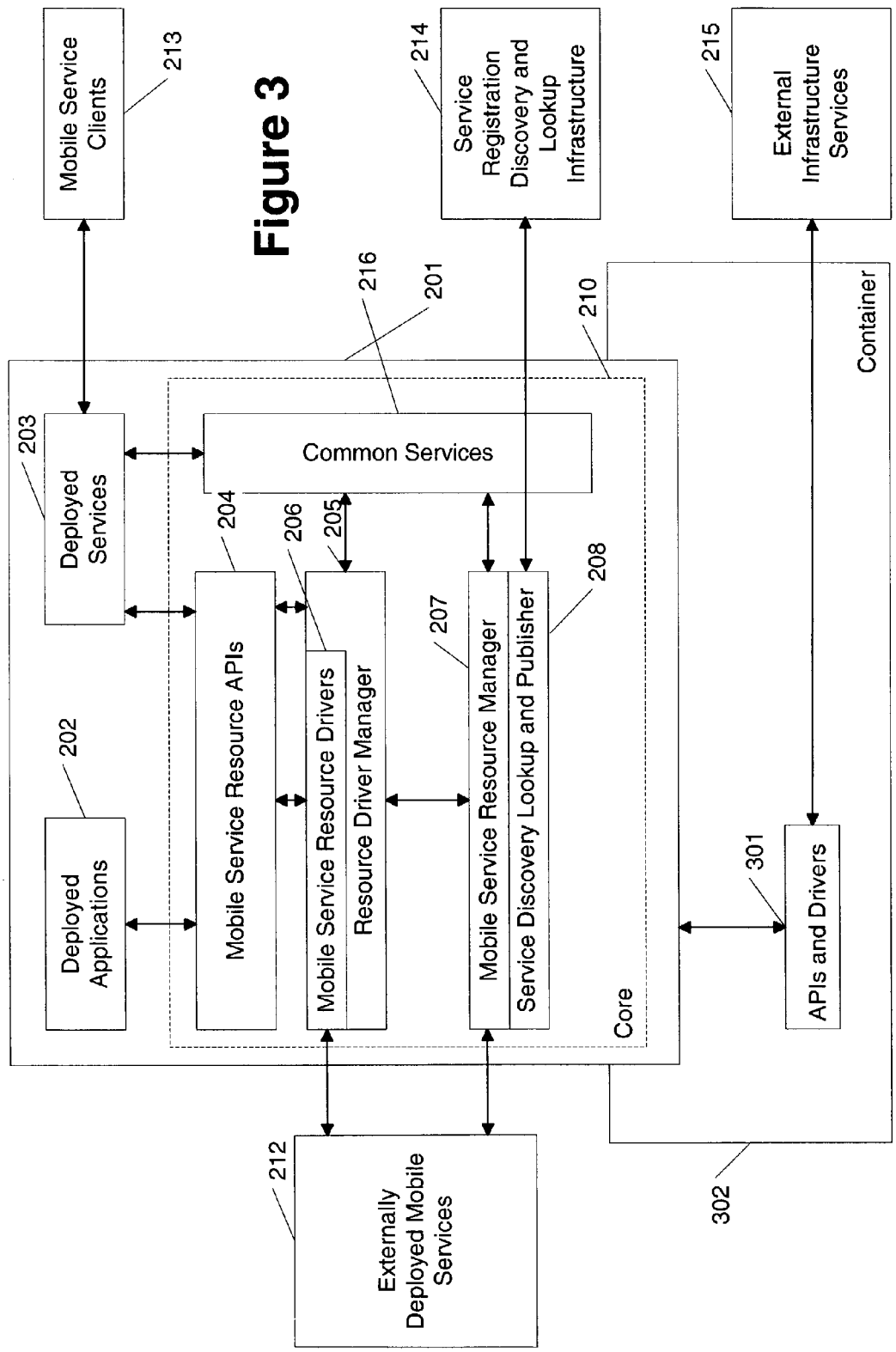
FIG. 3 shows the architecture of FIG. 2 with a modified foundation layer in accordance with aspects of the present invention.

FIG. 3 presents a logical architecture for a Java based implementation of the container. It leverages the established J2EE framework to provide the execution environment and the infrastructure service support for the services and applications deployed in the container. In this representation, J2EE framework provides the foundation layer for the mobile application service container 210. The Java container 302 contains APIs and drivers. The APIs and drivers 301 in the container 302 are connected to the external infrastructure services 215. Further, FIG. 3 shows examples of mobile service resource APIs 204 which may be Java APIs for various standard mobile services. These Java APIs may be standardized across multiple vendor providers.

By using the J2EE framework as a foundation layer, many of the standard application service functionalities can be obtained directly from the J2EE framework, which defines a standard set of enterprise class service APIs for tasks such as database access, transaction management, and the like. The availability of a large number of J2SE-based (Java 2 standard edition) or J2EE-based (Java 2 enterprise edition) APIs and their implementations provide the container with access to standard infrastructure resources such as databases, message stores, and other external services, including IN services (intelligent network services including toll free numbers and the like) accessible through JAIN APIs. JAIN APIs are a set of JAVA APIs supporting IN services.

The mobile application service container 201 may also be implemented using a non-Java platform. In such a scenario, the foundation layer functionalities provided in the infrastructure services and serve enablers module 209 would need to be provided.

Figure 4:
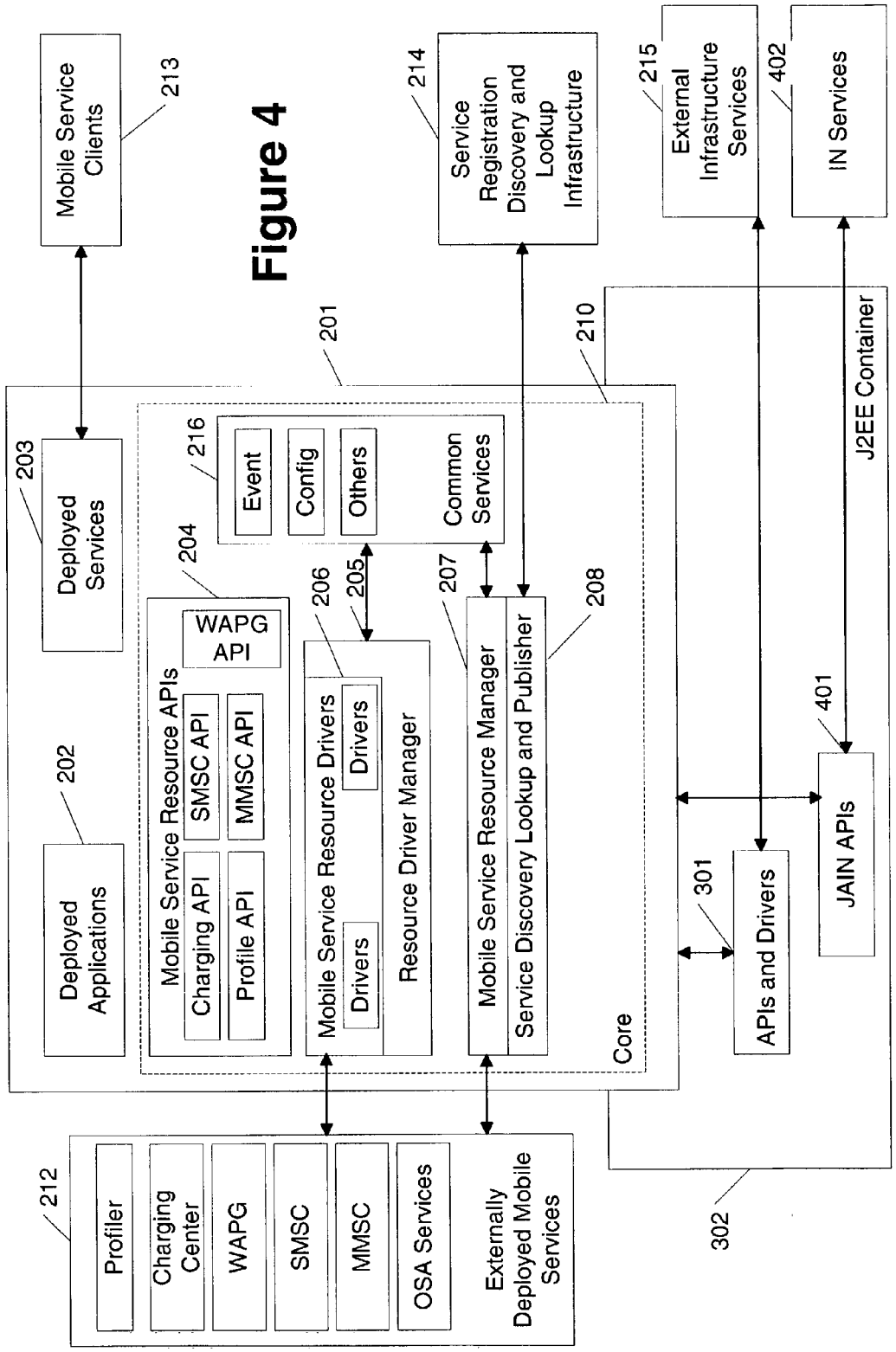
FIG. 4 shows a J2EE-based view of the architecture of FIG. 2 in accordance with aspects of the present invention.

FIG. 4 provides a more detailed view of various components to the modules of FIG. 3. Mobile service resource APIs 204 includes APIs such as a charging API (that handles cost accounting responsibilities), a profile API (that handles identification responsibilities for identifying users to the system), an SMSC API (that handles short messaging services), a MMSC API (that handles multimedia and messaging services with mobile terminals), and a WAPG API (that handles wireless application protocol-based interaction). The common services 216 module includes additional resources including event handling, configuration, and other resources as are known in the relevant field. The mobile service resource drivers 206 are shown with multiple drivers, with a generic driver shown in greater detail in FIG. 5. The interfaces for SMSC, MMSC, and WAPG have some of standardization. For example, MMSC interfaces are being standardized. There are multiple SMSC protocol standards from various vendors. The WAPG service interface typically has proprietary extensions by different vendors. Another aspect with the present invention is that most of the current services standardization effort is done at a protocol interface level, where as the container requires standardization or unification at the API (application programming interface) level. In aspects of the present invention, the API and the accompanying drivers are built on top of these protocol interfaces. In some examples, such APIs may have been standardized through forums such as the Java Community Process (for Java-based solutions).

Externally deployed mobile services 212 are shown in FIG. 4 including various services including, but not limited to, profiling services, cost accounting and charging center services, WAPG services, SMSC services, MMSC services, and OSA services. The external service registration discovery and lookup infrastructure includes JINI services.

Finally in FIG. 4, a J2EE based foundation layer is capable of supporting JAIN APIs 401 that provide the ability to access intelligent network (IN) services 402.

Figure 5:
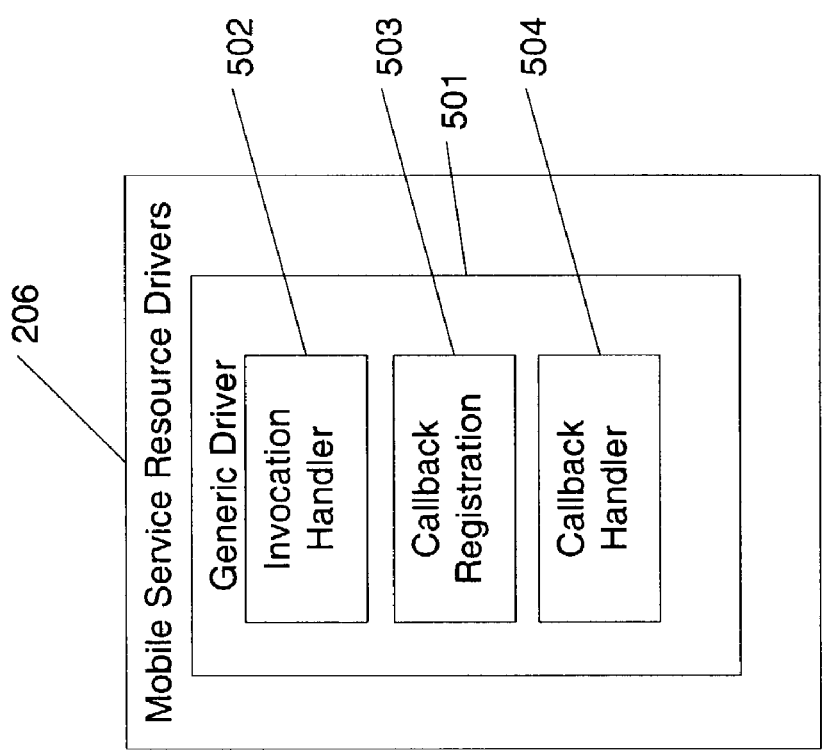
FIG. 5 shows a conceptual architecture of generic resource drivers that used for the container's interoperability in accordance with aspects of the present invention.

FIG. 5 shows a generic driver 501 that belongs to the group of mobile resource drivers 206. From the conceptual architectural viewpoint, the generic driver may include an invocation handler 502, a callback registration mechanism 503, and a callback handler 504.

Figure 6:
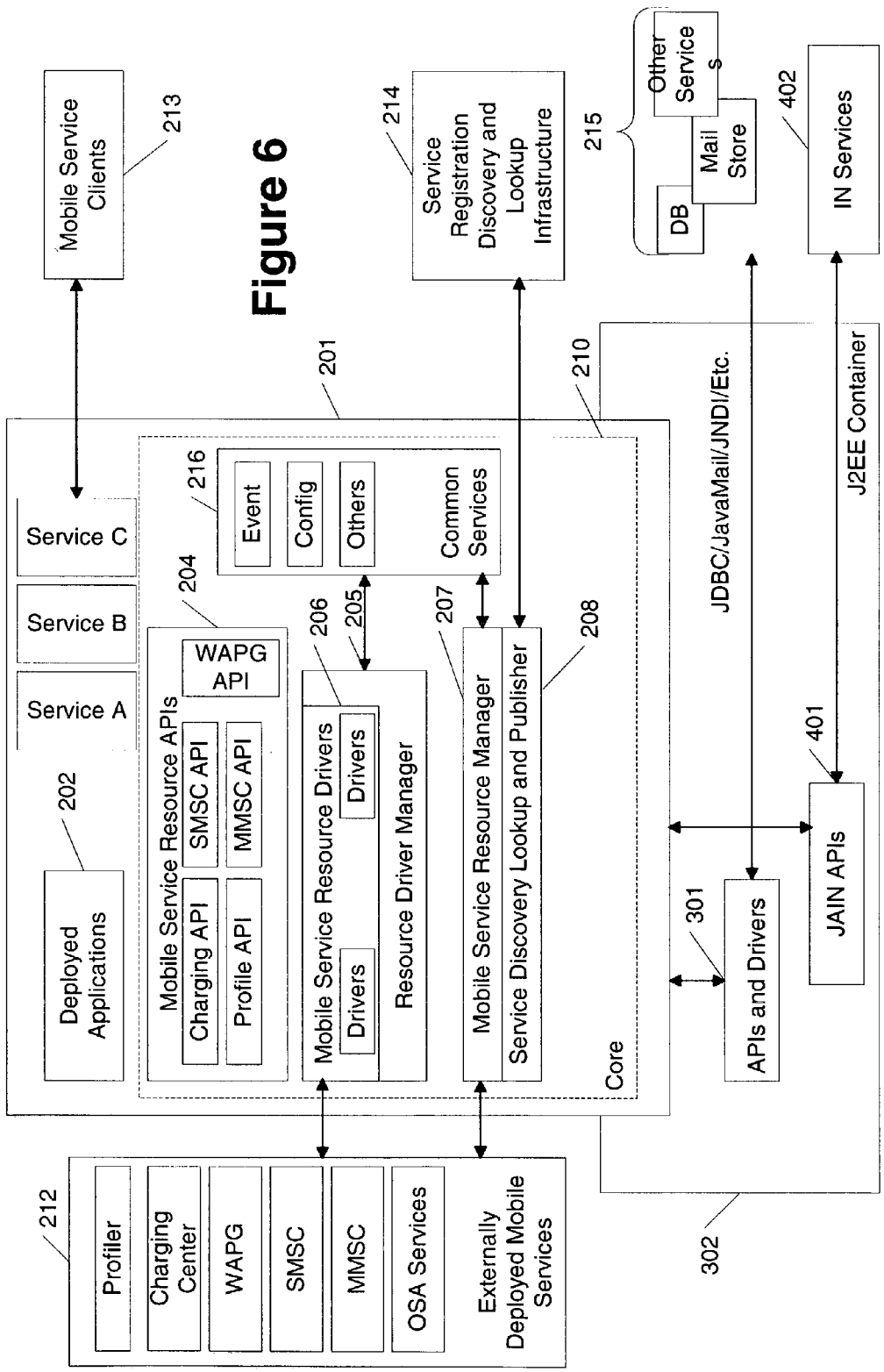
FIG. 6 shows an alternate representation of the architecture of FIG. 2 in accordance with aspects of the present invention.

FIG. 6 shows the architecture of FIG. 4 with different instances/examples of deployed services 203 being deployed as services A, B, and C. Also examples of external infrastructure services 215 are shown as a collection of database, mail and store, and other services.

Figure 7:
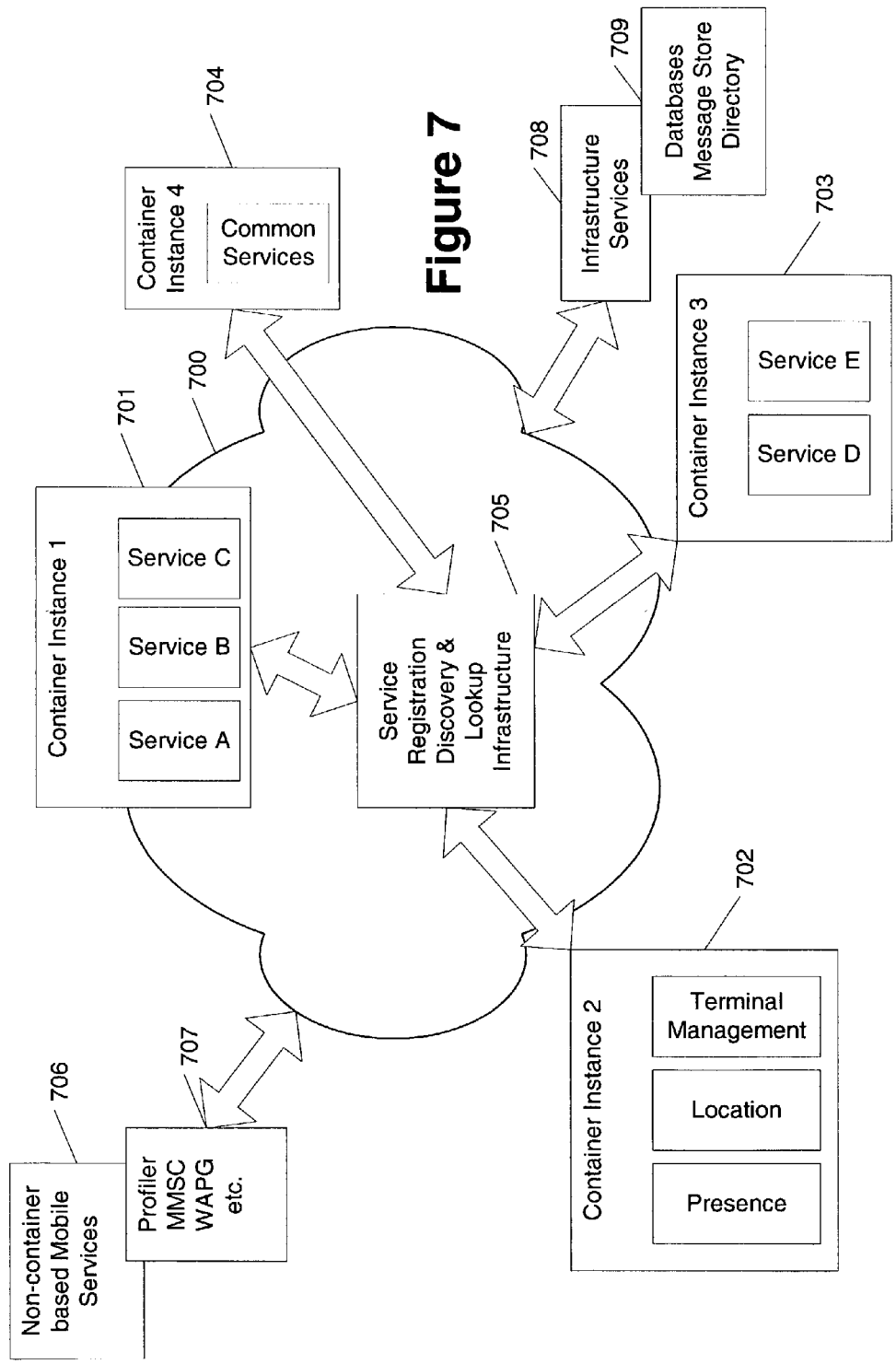
FIG. 7 shows containers distributed about a network, affected by load and available resource limitations in accordance with embodiments of the present invention.

FIG. 7 presents an example of how multiple instances of mobile application service containers may be deployed in a mobile network. Network 700 includes a service registration discovery and lookup infrastructure 705. Four instances of container 201 exchange information with the service registration discovery and lookup infrastructure 705. Container instance 1 701 includes services A, B, and C. Container instance 2 702 contains presence, location, and terminal management services. Container instance 3 703 contains services D and E. Container instance 4 704 includes common services. Among the four container instances 701–704, there is only one occurrence of each of the unique services. They are distributed around the network 700. Accordingly, and if a mobile user needs to access a service, a request from the mobile user will be sent to the service registration discovery and lookup infrastructure 705 and then to the appropriate container instance housing the desired service. In addition to the services provided in the container instances, other services including infrastructure services 708 and databases, message stores, and directories 709 may be available to the network 700 as well. Finally, non-container based mobile services (for example from a variety of vendors) 706 and other control centers (profile, MMSC, SMSC, WAPG, and the like) 707 may be available to the network 700. The services distributed about network 700 and maybe done so in a manner that is dictated by load and available computational resources.

Figure 8:
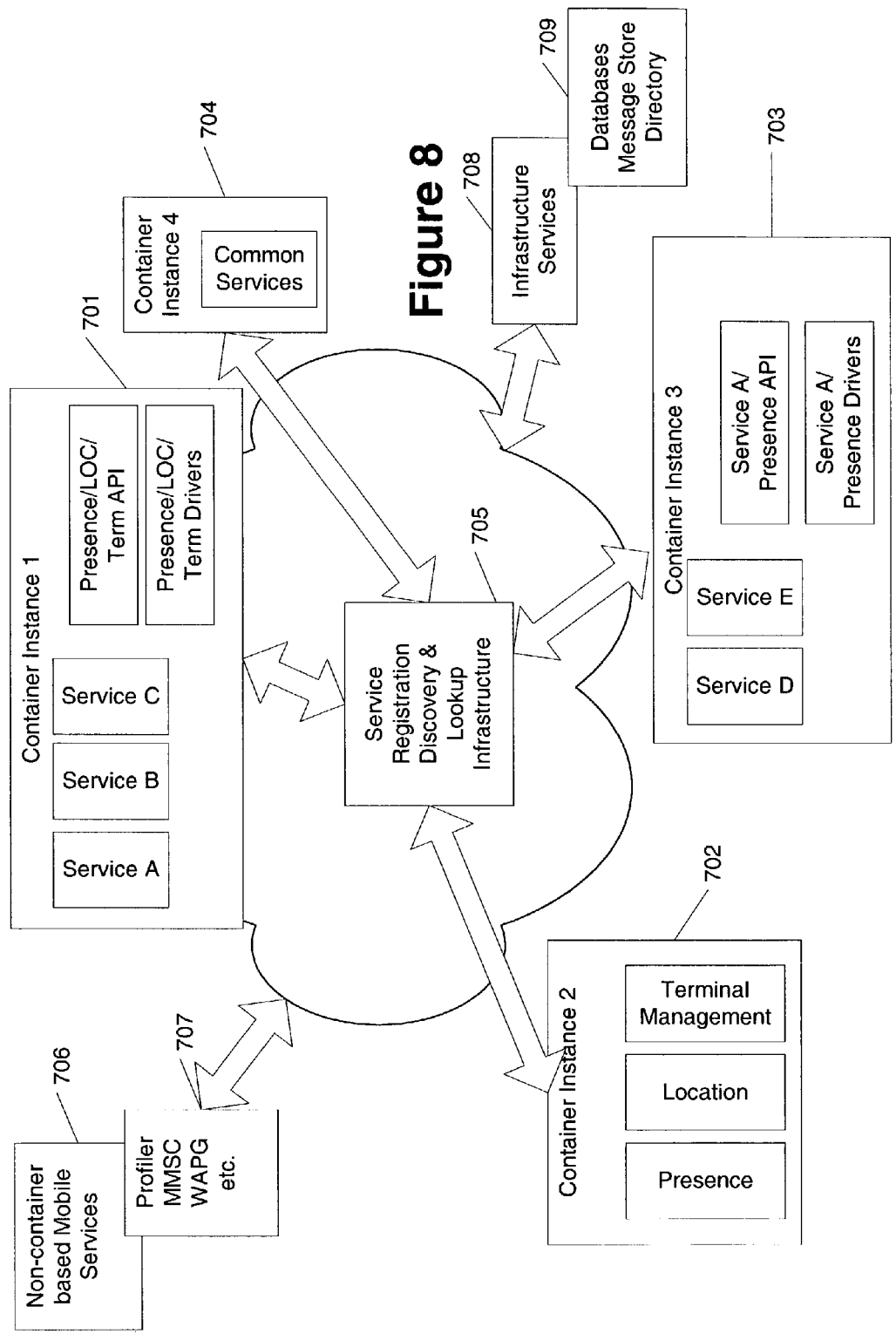
FIG. 8 shows an alternate representation of the distribution of FIG. 7, in accordance with embodiments of present invention.

FIG. 8 is a further variation of FIG. 7 in which container 1 701 includes presence, location, and terminal management APIs and drivers. Here, container 1 701 contains the APIs and drivers for interaction with the services provided in container instance 2 702. The container instance 3 703 includes service A and presence APIs and drivers. Here, container instance 3 703 includes the APIs and drivers for interacting with the services found in container instance 1 701 and container instance 2 702. Because additional APIs and drivers may be dispersed throughout the network, a greater level of interoperability is provided for users when network load becomes high or divergent services are provided on the framework. In some aspects, container-based services may also publish APIs to others for use with the services provided by the originating container instance. To enhance efficiency, in some aspects drivers may be distributed to promote efficiencies for the client in interacting with services. This may be dependent on whether the framework is Java-based or non-Java-based, as the drivers may not be needed if using a Java-based container.

Figure 9:
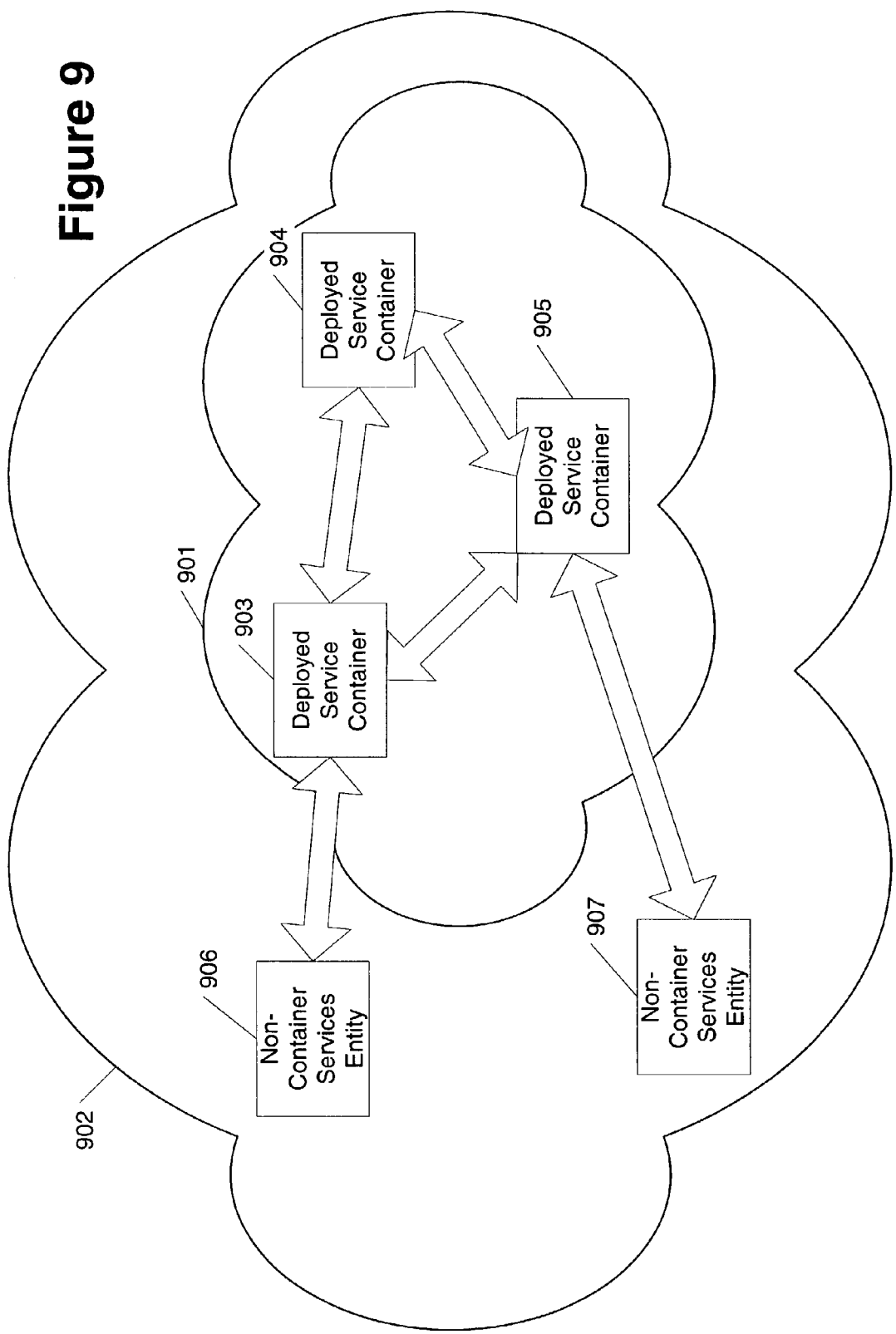
FIG. 9 shows deployed container based services, in accordance with embodiments of the present invention.

FIG. 9 is a high level overview of an operator's network 902 where container-based services 903–905 (forming network 901) are deployed among non-container based services 906 and 907. Here, in FIG. 9 then, the containers are capable of mutual discovery and lookup. Within this network 901 the services found in the deployed service containers 903–905 are capable of operating in a federation of loosely connected nodes where services are able to dynamically join and leave the network 901. Fail over and recovery are handled by routing service requests to other serving nodes (containers) in the network 901. Services may be able to dynamically join the network by registering the registration/discovery/lookup subsystem when the service starts up. It remains registered by periodic notification. Similarly, it can leave the network by indicating to the same subsystem that it is leaving the system or it simply fails to provide periodic notification due to a crash. Capabilities like these are provided by services like JINI, as described above.

FIG. 10 shows a process of migrating a service vendor's existing mobile services solution to a form extensible to a mobile application service container. In step 1001, the foundation is created for a service container. This may include defining a Java API for non-Java services (for example, third party or otherwise). This step may also begin the implementation of the drivers for these services.

Once the APIs for commonly used services are defined, specific drivers may be implemented for mapping a service API to one or more specific implementations. Those services themselves may be implemented in Java/C++/etc. and may be communicated with using RMI, CORBA, HTTP, SMTP, and other protocols. The driver is responsible for hiding the implementation details behind the published API. For situations where protocols exposed by the services are standardized, only one implementation of a driver may be sufficient. In other non-standard situations multiple drivers may be needed to bridge the gap.

Next, in step 1002, components are identified for use with the mobile application service containers. This may include identification of the component boundaries of existing Java services. Where the existing Java services do not cover new services, new Java handlers may be created.

Next in step 1003, the Java services are adjusted to comport with the new mobile application service container. This may include remotely enabling services for a distributed deployment. This may also include creating new Java services distributing them about the network. If needed, Java API and client handlers may be defined for uniform access with callback mechanisms for use by the service clients. If alternative implementations are going to be used of a singular service, then separate APIs may be defined to support the alternate implementations. This may also include retrofitting applications and services to run in the container when making them use defined APIs and drivers for other previously defined services.

Next, the containers with the services are deployed in step 1004 or the services are deployed to existing containers. A deployment strategy may be applied to how the services or the containers with the services (for example supplying redundant containers to heavy network traffic areas) are distributed.

Next, new mobile services are added to the infrastructure in step 1005. Preferably a standard set of APIs is used to access non-Java services. In most instances, custom implementation of access mechanisms is not needed.

Finally, the process returns from step 1005 to step 1003 to the re-engineering of Java-based services to ensure compliance with the mobile application service container model.

Referring again to FIG. 2, suppose that the externally deployed mobile services 212 want to make use of the container 201. An example of a process used to retool how services are integral container 201 is set forth in relation to FIG. 10. Here, the existing services are modified to use the same container-defined APIs instead of their own legacy APIs. In some situations such changes may be trivial, particularly when the API in question has already been standardized. However, this may involve a significant reworking of the functionality of the external services 212. The services developed using the container framework may then be deployed using single or multiple instances of the container depending on the expected service load and available computing hardware resources as shown in FIGS. 7 and 8.

As new and legacy services are defined and deployed in association with the container 201, they will need to provide mutual accessibility by publishing their own APIs and drivers, when appropriate (FIG. 8). These APIs may eventually evolve to some form of standardized definition, particularly when the possibility of alternate implementations exists.

Although the invention has been defined using the appended claims, these claims are illustrative in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein cover all such modifications and alterations.

We claim:

1. A computer readable medium having a program stored thereon, said program when implemented forming a container for supporting creation and deployment of rich, high level distributed mobile services across a network, said network having multiple instances of said container in said network, said program comprising:
    a foundation layer having infrastructure services supporting said mobile services for users, said mobile services including real-time and non-real-time services; and
    a core layer having a driver manager and a resource manager, said resource manager including a service discovery lookup and publisher that looks for new resources in said network, said core layer interacting with other core layers of said multiple instances of said containers to obtain information regarding said new resources.

2. The computer readable medium according to claim 1, further comprising:
    resource application programming interfaces exchanging information with said resource manager and at least one deployed mobile service.

3. The computer readable medium according to claim 2, wherein said core layer and said foundation layer form a container that supports at least one deployed mobile service communicating with at least one mobile service client.

4. The computer readable medium according to claim 1, wherein said resource manager communicates with at least one externally deployed mobile service.

5. The computer readable medium according to claim 1, wherein said driver manager communicates with at least one externally deployed mobile service.

6. The computer readable medium according to claim 1, wherein said foundation layer includes a Java container.

7. The computer readable medium according to claim 1, wherein said foundation layer includes a non Java container.

8. The computer readable medium according to claim 1, wherein said discovery lookup and publisher module communicates with a service registration discovery and lookup infrastructure.

9. The computer readable medium according to claim 1, wherein said driver manager of said core layer manages vendor-specific resource drivers permitting mobile services to use said vendor-specific drivers and wherein said resource manager of said core layer manages access to said mobile services.

10. A process executing in at least one computer for converting mobile services in a network to a centralized framework comprising the steps of:
    creating a foundation layer having infrastructure services for said framework, said infrastructure services including real-time and non-real-time services;
    identifying components of existing services in a core layer;
    adjusting aspects of the existing services to comport with components of said framework; and
    discovering new services by said core layer as the services become available.

11. The process executing in at least one computer according to claim 10, further comprising the steps of:
    adding new capabilities to said framework; and
    adjusting aspects of the existing services to comport with said new capabilities.

12. A computer readable medium having a program stored thereon, said program having instructions for efficiently deployed real-time and non-real-time services across a network, said program when implemented forming a container, said container being one of a multiple containers across said network, said program comprising:
    a first container instance supporting a first service; and
    a second container instance supporting a second service, said second container also including a module for actively discovering new services across said network,
    wherein said second container instance also includes at least one API for said first service supported by said first container, and
    wherein said second container instance does not include said first service and said first container instance and said second container instance do not contain identical services and cooperate with each other, thereby forming a larger virtual container where services contained by each container instance are made available to new services and applications built on the larger virtual container.

13. The computer readable medium according to claim 12, wherein said second container instance also includes at least one driver for said first service.

14. A computer readable medium having a program stored thereon, said program for supporting mobile services across a network, said program when implemented forming a container, said container being one of a multiple containers across said network, said program comprising:
   a foundation layer having internal infrastructure services relating to said mobile services, wherein said internal infrastructure services are provided by accessing external infrastructure services, said mobile services including real-time and non-real-time services; and
   a core layer having a driver manager and a resource manager, said resource manager including a service discovery lookup and publisher that looks for new resources accessible through other containers in said network.

15. The computer readable medium according to claim 14, further comprising:
   resource application programming interfaces exchanging information with said resource manager and at least one deployed mobile service.

16. The computer readable medium according to claim 15, wherein said core layer and said foundation layer form a container that supports at least one deployed mobile service communicating with at least one mobile service client.

17. The computer readable medium according to claim 14, wherein said resource manager communicates with at least one externally deployed mobile service.

18. The computer readable medium according to claim 14, wherein said driver manager communicates with at least one externally deployed mobile service.

19. The computer readable medium according to claim 14, wherein said foundation layer includes a Java container.

20. The computer readable medium according to claim 14, wherein said foundation layer includes a non Java container.

21. The computer readable medium according to claim 14, said discovery lookup and publisher module communicates with a service registration discovery and lookup infrastructure.

22. The computer readable medium according to claim 14, wherein said driver manager of said core layer manages vendor-specific resource drivers permitting mobile services to use said vendor-specific drivers and wherein said resource manager of said core layer manages access to said mobile services.

* * * * *